United States Patent
Zhang et al.

(10) Patent No.: US 8,861,968 B2
(45) Date of Patent: Oct. 14, 2014

(54) RECONFIGURABLE OPTICAL ADD/DROP MULTIPLEXING DEVICE FOR ENABLING TOTALLY INRESISTANT COLORLESS

(75) Inventors: Hongyu Zhang, Shenzhen (CN); Bing Ye, Shenzhen (CN)

(73) Assignee: ZTE Corporation (CN)

( * ) Notice: Subject to any disclaimer, the term of this patent is extended or adjusted under 35 U.S.C. 154(b) by 141 days.

(21) Appl. No.: 13/383,151

(22) PCT Filed: Sep. 16, 2009

(86) PCT No.: PCT/CN2009/073974
§ 371 (c)(1),
(2), (4) Date: Jan. 9, 2012

(87) PCT Pub. No.: WO2011/003247
PCT Pub. Date: Jan. 13, 2011

(65) Prior Publication Data
US 2012/0114332 A1    May 10, 2012

(30) Foreign Application Priority Data
Jul. 9, 2009    (CN) .......................... 2009 1 0158384

(51) Int. Cl.
*H04B 10/00*    (2013.01)
*H04J 14/02*    (2006.01)

(52) U.S. Cl.
CPC ......... *H04J 14/0212* (2013.01); *H04J 14/0217* (2013.01); *H04J 14/0204* (2013.01); *H04J 14/0219* (2013.01)
USPC .......................................................... 398/83

(58) Field of Classification Search
USPC .......................................................... 398/83
See application file for complete search history.

(56) References Cited

U.S. PATENT DOCUMENTS 7,027,732 B2 *   4/2006   Paiam et al. .................... 398/50
7,308,197 B1 *   12/2007  Zhong et al. .................... 398/48
(Continued)

FOREIGN PATENT DOCUMENTS

CN    1427571    7/2003
CN    101136717   3/2008
(Continued)

OTHER PUBLICATIONS

European Search Report from European Patent Application No. EP 09846998.4 dated Nov. 19, 2012.
(Continued)

*Primary Examiner* — Agustin Bello
(74) *Attorney, Agent, or Firm* — Workman Nydegger (57) ABSTRACT

The present invention provides a reconfigurable optical add/drop multiplexing device for enabling a totally inresistant colorless, wherein a dropping unit is configured to separate multi-wavelength optical signals which are among direction 1~X and are broadcast inputted in a circuit direction, switch the multi-wavelength optical signals among the direction 1~X to any corresponding output port through multiple N×N optical switches, and send the optical signals to a corresponding Receiver (RX) after combining the received optical signals by a corresponding K×1 coupler/optical switch; an adding unit is configured to broadcast the optical signals sent by a Transmitter (TX) to the multiple N×N optical switches through N 1×K couplers/optical switches, switch the optical signals to any corresponding output port by each optical switch, and output the corresponding optical signals in the direction 1~X to the circuit direction after the optical signals are implemented with optical multiplexing; wherein, X is an integer which is greater than or equal to 2, and K and N are both integers. The present invention can enable the totally inresistant colorless in adding and dropping units.

18 Claims, 6 Drawing Sheets

(56) References Cited

U.S. PATENT DOCUMENTS

| | | | |
|---|---|---|---|
| 7,792,428 B2 * | 9/2010 | Akiyama et al. | 398/83 |
| 7,853,148 B2 * | 12/2010 | Akiyama et al. | 398/83 |
| 8,116,630 B2 * | 2/2012 | Wisseman | 398/83 |
| 8,126,330 B2 * | 2/2012 | Wisseman | 398/83 |
| 8,190,027 B2 * | 5/2012 | Boduch et al. | 398/83 |
| 8,412,042 B2 * | 4/2013 | Ghioni et al. | 398/70 |
| 8,447,183 B2 * | 5/2013 | Boduch et al. | 398/83 |
| 8,494,316 B2 * | 7/2013 | Zhang et al. | 385/24 |
| 2003/0025956 A1 * | 2/2003 | Li et al. | 359/110 |
| 2004/0165813 A1 | 8/2004 | Kouns | |
| 2005/0265720 A1 | 12/2005 | Ling et al. | |
| 2006/0034610 A1 * | 2/2006 | Akiyama et al. | 398/83 |
| 2009/0041457 A1 * | 2/2009 | Maki et al. | 398/45 |
| 2009/0148166 A1 * | 6/2009 | Akiyama et al. | 398/83 |
| 2010/0142961 A1 * | 6/2010 | Wisseman | 398/83 |
| 2011/0038636 A1 * | 2/2011 | Akiyama et al. | 398/85 |
| 2012/0114332 A1 * | 5/2012 | Zhang et al. | 398/48 |

FOREIGN PATENT DOCUMENTS

| | | |
|---|---|---|
| CN | 101227247 | 7/2008 |
| EP | 1 628 424 A2 | 2/2006 |

OTHER PUBLICATIONS

International Search Report from International Application No. PCT/CN2009/073974 dated Apr. 15, 2010.

English translation of the International Search Report from International Application No. PCT/CN2009/073974 dated Apr. 15, 2010.

* cited by examiner

RECONFIGURABLE OPTICAL ADD/DROP MULTIPLEXING DEVICE FOR ENABLING TOTALLY INRESISTANT COLORLESS

CROSS-REFERENCE TO RELATED APPLICATIONS

This application is a U.S. Nationalization of PCT International Application No. PCT/CN2009/073974 filed 16 Sep. 2009, entitled "RECONFIGURABLE OPTICAL ADD/DROP MULTIPLEXING DEVICE FOR ENABLING TOTALLY INRESISTANT WAVELENGTH IRRELEVANCE", which claims priority to Chinese Patent Application No. 200910158384.9, filed 9 Jul. 2009, the contents of each of the foregoing applications are incorporated herein, in their entirety, by this reference.

FIELD OF THE INVENTION

The invention relates to the field of optical communications, and in particular to a reconfigurable optical add/drop multiplexing device for enabling a totally inresistant colorless (wavelength irrelevance).

BACKGROUND OF THE INVENTION

At present, Dense Wavelength Division Multiplexing (DWDM) devices have been widely applied in the backbone networks and the local and metro core networks; the networking topology of the DWDM devices has transited from the simple point-to-point to the ring network and the two-ring intersection, and is finally applied in a mesh network. The service type has transited from a Time Division Multiplexing (TDM) service-based circuit switching service to an IP-based data service. Because of the uncertainty of the service development and the increase of difficulties in preliminary estimation, the devices are required to be intelligent, and required to rapidly and flexibly realize the service scheduling functions, so as to be adapted for the changes of the networking and service distribution when the network topologies and the service distribution have changed.

Similar to the Synchronous Digital Hierarchy (SDH) devices which enable the switching and scheduling for VC-4, the intelligence of the networks requires the DWDM devices to provide the reconfigurable functions based on the wavelength, i.e., wavelength Reconfigurable Optical Add Drop Multiplexing (ROADM), which can flexibly enable the add and drop multiplexing function of the wavelength and implement remote configuration. The ROADM can realize any point-to-point connection without manual deployment, and can realize the adding, dropping and straight-through configuration of the single wavelength. The ROADM technology can increase the flexibility of the Wavelength Division Multiplexing (WDM) network, make the network operators remotely and dynamically control the wavelength transmission path, and effectively reduce the operation and maintenance cost of the operators. Meanwhile, with the development of the network scale and the diversity of the service types, a multidirectional intelligent ROADM system which can realize the service broadcast function needs to be provided.

Figure 1:
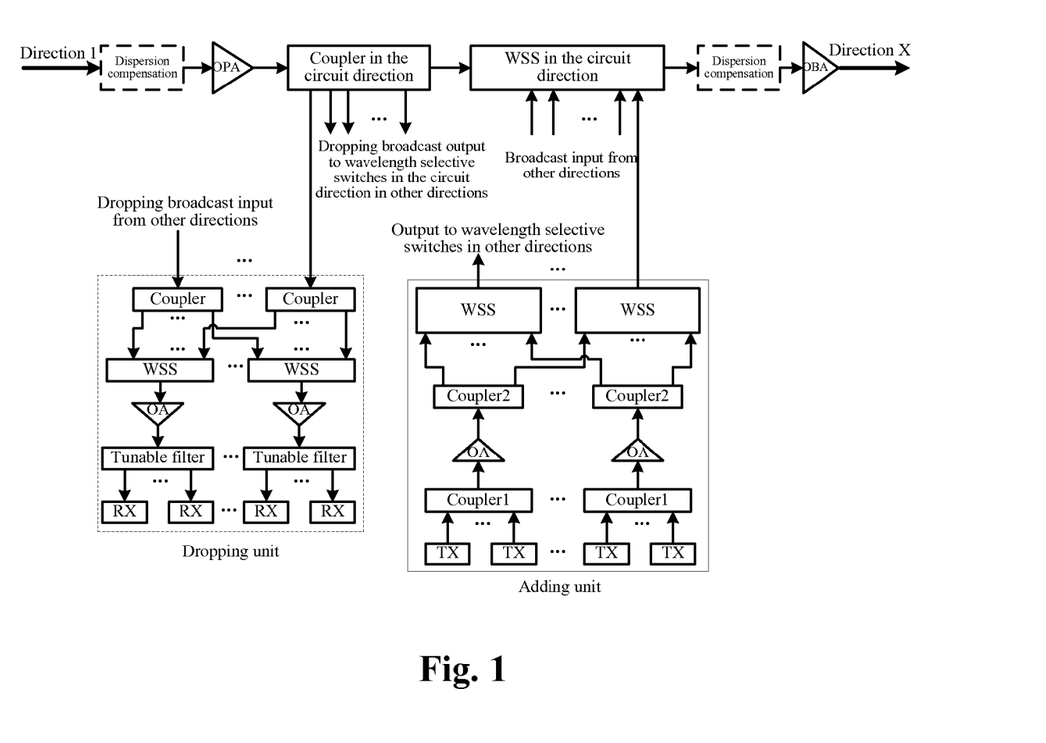
FIG. 1 is a schematic diagram of the ROADM device according to related technology.

FIG. 1 shows a diagram of an existing ROADM device. The device comprises three parts which are a circuit direction, a dropping unit and an adding unit. In particular, after the optical signals, which are transmitted through the optical fibres from the direction 1 to the direction X respectively, enter into a dispersion compensation module in the direction (the module is selected according to the dispersion and the dispersion tolerance of the system) to be implemented with dispersion compensation, the optical signals then enter into an Optical Preamplifier (OPA) in the corresponding direction to be amplified to make up for the line loss. And then they enter into the couplers of the circuit direction in the corresponding direction to broadcast the optical signals in the direction to the Wavelength Selective Switch (WSS) and the dropping unit in each circuit direction in the form of broadcast. The WSS in the circuit direction of the direction broadcasts the inputted signals which are inputted to the direction from each direction, and multiplex it with selected wavelength signals from the signals inputted by the adding unit. And then, the WSS outputs the wavelength signals which are implemented with the optical multiplexing to the dispersion compensation module (the module is selected according to the dispersion and dispersion tolerance of the system), and then to the circuit optical fibre after the signals are amplified by the Optical Booster Amplifier (OBA). The wavelength scheduling among the X circuit direction can be realized through the matching of the units, and the wavelength scheduling can be realized through remotely controlling the WSS by the network manager of the devices.

The dropping unit in FIG. 1 consists of couplers, WSSes, Optical Amplifiers (OAs), tunable filters and receivers (RXes), wherein the optical signals in the direction 1~X which are broadcasted and dropped through the coupler in the circuit direction are distributed into multiple groups through power allocation by the coupler of the dropping unit (for example, the broadcasted optical signals can be distributed into 2 groups by adopting 1×2 couplers, and can be distributed into 4 groups by adopting 1×4 couplers, and so on). Each group is outputted after the WSS selects the wavelength signals which need to be dropped from the optical signals inputted in each direction to perform optical multiplexing, and is outputted to the tunable filter to select the dropping wavelength after being amplified by the OA. And it is received by the RX, so as to realize the directionless and colorless dropping functions. But each group cannot have the same wavelength dropping. The same wavelength can be divided into multiple groups of droppings by the couplers. The tunable filter can be realized by the WSS. And the reconfiguration of the dropping wavelength can be realized by the network manager of the devices through remotely controlling the WSS and the tunable filter.

The adding unit in FIG. 1 consists of WSSes, couplers 1, OAs, couplers 2 and transmitters (TX), wherein each group of the optical signals transmitted by the TX are outputted to the coupler 2 after optical multiplexing by the coupler 1 of the group and then being amplified by the OA. The coupler 2 outputs the multiplexed optical signals to the WSS in each direction in the form of broadcast, and the WSS in each direction outputs each group of the optical signals to the WSS in the circuit direction in the corresponding direction after selectively implementing optical multiplexing for the optical signals. The directionless and colorless dropping functions can be realized when the TX is the one with tunable wavelengths. But each group cannot have the same wavelength adding, the same wavelength can be divided into multiple groups, and can be realized by the WSS through selectively implementing optical multiplexing for each group of signals. The reconfiguration of the adding wavelength can be realized by the network manager of the devices through remotely controlling the WSS and the TX with tunable wavelengths.

However, the related art only can realize part of the colorless, i.e., the dropping wavelength under each wavelength selection and the allocation unit cannot be the same, and the adding wavelength under each optical multiplexing and the allocation unit cannot be the same. Furthermore, as the adjustable optical filter array is immature, although the WSS is adopted to realize the reconfigurable dropping at present, the WSS apparatus is expensive. The WSS apparatus with more than 9 ports is immature, and multiple WSSes are needed when realizing the adding and dropping with more wavelengths. Thus the ROADM device has a high cost and a large size.

SUMMARY OF THE INVENTION

The present invention aims to provide a reconfigurable optical add/drop multiplexing device for enabling totally inresistant colorless, which can realize add and drop with totally inresistant colorless.

The reconfigurable optical add/drop multiplexing device for enabling totally inresistant colorless according to the invention comprises a: a dropping unit and an adding unit, wherein the dropping unit is configured to separate optical signals of multiple wavelengths in direction 1~X which are broadcast inputted from a circuit direction, switch the optical signals of multiple wavelengths in the direction 1~X to any corresponding output port through multiple N×N optical switches, and transmit the optical signals to corresponding RXs after combining the optical signals through the corresponding K×1 couplers/optical switches; and the adding unit is configured to broadcast the optical signals which are transmitted from TXs to multiple N×N optical switches through N 1×K couplers/optical switches, switch the optical signals to any corresponding output port through the respective N×N optical switches, and multiplex the corresponding optical signals in the 1~X direction and output the corresponding optical signals to the circuit direction, wherein X is an integer greater than or equal to 2, and K and N are both integers.

Where, the dropping unit is provided with 1×M demultiplexers in the direction 1~X and Y N×N optical switches, wherein the 1×M demultiplexers in the direction 1~X are configured to separate the optical signals of different wavelengths in the direction 1~X which are broadcast inputted from the circuit direction, and output to the Y N×N optical switches; and the Y N×N optical switches are configured to switch the input optical signals of multiple wavelengths in each direction to any corresponding output port, and transmit the corresponding K×1 couplers/optical switches, wherein X is an integer greater than or equal to 2; K, Y, M and N are integers greater than or equal to 1; K is greater than or equal to Y, N is greater than or equal to M, and Y×N is greater than or equal to X×M.

Where, the dropping unit is also provided with 1×L couplers in the direction 1~X, wherein L is an integer greater than or equal to 1, and is configured to separate the optical signals of multiple wavelengths in the direction 1~X which are broadcast inputted from the circuit direction into L parts through the 1×L couplers respectively, and output the separated optical signals to the 1×M demultiplexers in the direction 1~X.

Further, an optical amplifier (OA) is arranged between each of the 1×L couplers in the direction 1~X and the 1×M demultiplexers in the direction 1~X, and is configured to amplify the optical signals which are outputted from the 1×L couplers and output the amplified optical signals to the 1×M demultiplexers in the direction 1~X.

In addition, the adding unit is provided with M×1 multiplexers in the direction 1~X and Y N×N optical switches, wherein the Y N×N optical switches are configured to switch the optical signals of multiple direction broadcast from the 1×K couplers/optical switches to any corresponding output port; the M×1 multiplexers in the direction 1~X are configured to output the optical signals after multiplexing the optical signals in the corresponding direction outputted by the N×N optical switches.

Furthermore, the adding unit is further provided with L×1 couplers in the direction 1~X, wherein L is an integer greater than or equal to 1; and the adding unit is configured to couple signals outputted from the M×1 multiplexer through the L×1 couplers and output and broadcast the coupled signals to the circuit direction.

Moreover, an OA is set between each of the L×1 couplers in the direction 1~X and the M×1 multiplexers in the direction 1~X, and is configured to amplify the optical signals which are outputted from the M×1 multiplexers in the direction 1~X and output the amplified optical signals to the L×1 couplers in the direction 1~X.

In this case, the 1×M demultiplexers of the dropping unit adopt the technical devices such as array waveguide gratings (AWG) or thin film filters (TFF); and the M×1 multiplexers of the adding unit adopt the AWG, or TFF, or couplers.

In addition, when the adding unit adopts the 1×K couplers and the dropping unit adopts the K×1 couplers, the N×N optical switches of the adding unit and the dropping unit need to block the input optical signals which do not need to be outputted through the N×N optical switches respectively, that is, make the optical signals not to be outputted through any port; and when the adding unit adopts the 1×K optical switches and the dropping unit adopts the K×1 optical switches, the N×N optical switches of the adding unit and the dropping unit do not need to resist the input optical signals which do not need to be outputted through the N×N optical switches respectively.

In addition, 1×K couplers/optical switches of the adding unit and the K×1 couplers/optical switches of the dropping unit are all integrated in a module. The first port of each coupler outputs through a parallel optical fiber connector MPO connector, the second port outputs through another MPO connector, and so on. The M×1 multiplexers of the adding unit, the 1×M demultiplexers of the dropping unit and the N×N optical switches are all provided with MPO connectors. That is, the 1×M demultiplexers of the dropping unit, the N×N optical switches and the K×1 couplers/optical switches are connected through optical fiber of the MPO connectors; and the M×1 demultiplexers of the adding unit, the N×N optical switches and the 1×K couplers/optical switches are connected through the optical fibers of the MPO connectors.

The reconfigurable optical add/drop multiplexing device has the beneficial effects that: on the basis that the reconfigurable optical add/drop multiplexing device for enabling totally inresistant colorless can realize the irrelevance in the adding direction and the dropping direction, the broadcasting function of the signals in the adding and circuit direction, and the loopback function in the circuit direction, the add/drop totally inresistant colorless is realized; the optical fiber connection and the equipment volume are simplified by utilizing the parallel optical fiber connector MPO connector; and the equipment cost is reduced.

BRIEF DESCRIPTION OF THE DRAWINGS

The described figures are used for providing further understanding of the invention, and form part of the application. The schematic embodiments and the description thereof of the invention are used for explaining the invention and do not constitute unduly limitation to the invention. In the figures.

DETAILED DESCRIPTION OF THE EMBODIMENTS

The present invention is described below in detail by reference to the drawings in conjunction with embodiments. It should be noted that the embodiments in the application and the characteristics of the embodiments can be combined if no conflict is caused.

Hereinafter, by reference to FIG. 1 to FIG. 7, a detailed description of the reconfigurable optical add/drop multiplexing device for enabling totally inresistant colorless in the embodiment of the present invention is provided.

Figure 2:
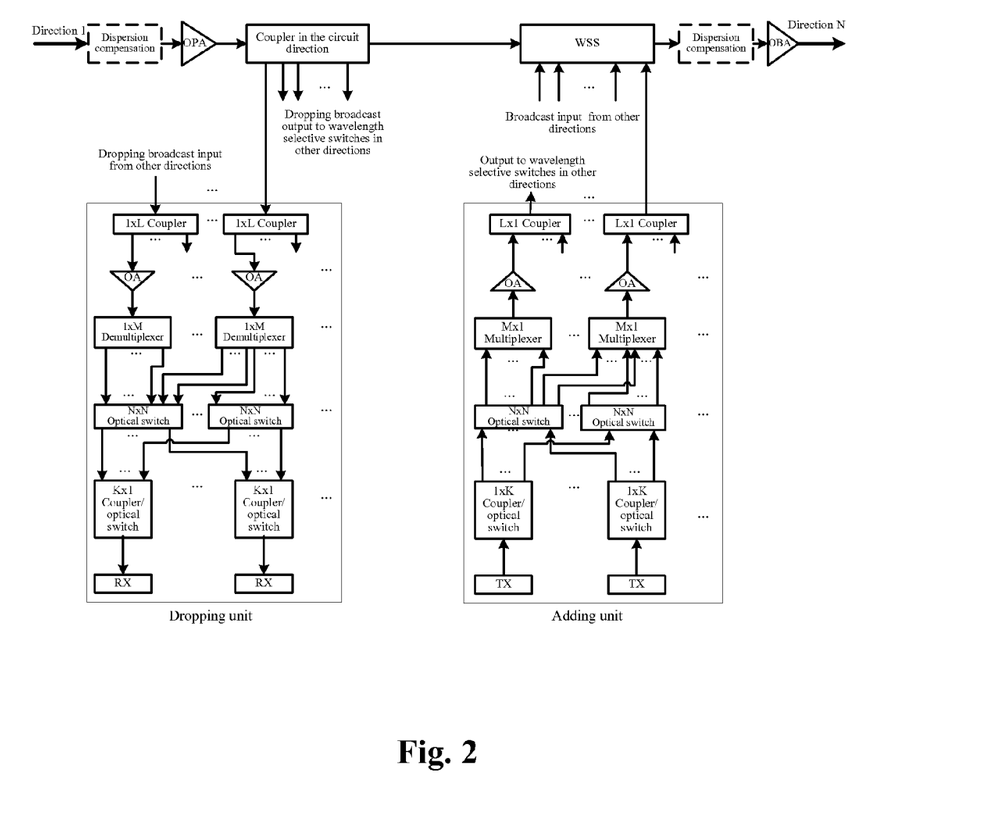
FIG. 2 is a schematic diagram of the ROADM device according to the embodiment of the invention.

The reconfigurable optical add/drop multiplexing device for enabling totally inresistant colorless according to the embodiment of the present invention realizes the totally inresistant colorless of the adding and dropping by improving the adding unit and the dropping unit, based on the present reconfigurable optical add/drop multiplexing device. As shown in FIG. 2, the device comprises a wavelength scheduling unit, a dropping unit and an adding unit.

Where, the wavelength scheduling unit is configured for wavelength scheduling in circuit direction 1~X, signal broadcasting in the circuit direction and loopbacking in the circuit direction. The wavelength scheduling unit comprises: an OPA in the direction 1~X, a coupler in the circuit direction of the direction 1~X, a WSS in the direction 1~X and an OBA in the direction 1~X. In addition, a dispersion compensation module in the direction 1~X can be configured according to the dispersion of the system and the dispersion tolerance degree. Where, X is an integer greater than or equal to 2; X is a direction number of ROADM nodes, that is, dimensionality; and the wavelength scheduling can be performed remotely by a network manager of the device.

The dropping unit is configured to separate optical signals of multiple wavelengths in the direction 1~X which are broadcast inputted from the circuit direction, switch optical signals of multiple wavelengths in the direction 1~X to any corresponding output port through multiple N×N optical switches, and sending the received optical signals to corresponding RX after combining the signals by the corresponding K×1 couplers/optical switches.

Where, the dropping unit comprises: a coupler in the direction 1~X, an OA in the direction 1~X, a 1×M demultiplexer in the direction 1~X (in which, K is an integer, M is the number of wavelengths in a single direction), Y N×N optical switches (in which, Y is an integer, N≥M, and Y×N≥X×M), N K×1 couplers/optical switches (in which, K is an integer, and K≥Y), and a RX.

Specifically, after the optical signals in respective direction 1~X broadcasted to the dropping unit through the coupler in the circuit direction are allocated with power by the coupler respectively, the signals are amplified by the OA and output to the 1×M demultiplexer in the direction 1~X. Then the demultiplexer separates the optical signals of respective wavelengths and outputs the signals to respective N×N optical switches which then switch the input optical signals of multiple wavelengths in each direction to any a corresponding output port. The K×1 coupler/optical switch outputs the optical signals selected by each N×N optical switch to the RX after multiplexing the signals.

Where, in order to realize the expansion of the number of dropping ports, the coupler in the direction 1~X can be the 1×L coupler in the direction 1~X, wherein L is an integer greater than or equal to 1. The optical signals in respective directions broadcasted to the dropping unit through the coupler in the circuit direction are split into L parts by the 1×L coupler respectively, wherein each part is outputted to the 1×M demultiplexer in the direction 1~X after being amplified by the OA.

In addition, the N×N optical switch and the K×1 coupler/optical switch can be controlled remotely by a network manager of the device to realize the reconfiguration of the dropping wavelength.

The adding unit is configured to broadcast optical signals which are sent from the TX to multiple N×N optical switches through N 1×K couplers/optical switches, switch optical signals to any corresponding output port through each optical switch, and multiplex corresponding optical signals in the direction 1~X to send to the circuit direction, wherein X is an integer greater than or equal to 2, both K and N are integers.

Correspondingly, the adding unit comprises a coupler in the direction 1~X, an M×1 multiplexer in the direction 1~X, Y N×N optical switches, K×1 coupler/optical switch and a TX.

Specifically, the optical signals of the adding of the TX are first broadcasted to Y N×N optical switches through the 1×K coupler/optical switch, then each N×N optical switch switches the optical signals of multiple wavelengths in each direction to any corresponding output port. The M×1 multiplexer in each direction multiplexes the optical signals selected by Y N×N optical switches to output to a coupler in the corresponding direction. Finally, the coupler in the corresponding direction outputs the signals to the WSS in the corresponding direction.

Where, the coupler in the direction 1~X can be the L×1 coupler in the direction 1~X to realize the expansion of the adding port number. In addition, the N×N optical switch and the 1×K coupler/optical switch can be controlled remotely by a network manager of the device to realize the reconfiguration of the adding wavelength.

In addition, the 1×M demultiplexer of the dropping unit can be a device adopting AWG or TFF technologies and is adapted to separate the signals of each wavelength. The M×1 multiplexer of the adding unit can be a device which is realized by adopting AWG, TFF, coupler and other technologies to multiplex the signals of each wavelength. When the device adopts a coupler, the optical power consumption is great, thus an OA needs to be added behind the M×1 multiplexer.

When the adding unit adopts 1×K coupler and the dropping unit adopts K×1 coupler, the N×N optical switches of the adding unit and the dropping unit need to block the input optical signals which don't have to be outputted through the N×N optical switches respectively, that is, make the optical signals not to be outputted through any port.

When the adding unit adopts 1×K optical switch and the dropping unit adopts K×1 optical switch, the N×N optical switches of the adding unit and the dropping unit do no need to block the input optical signals which don't have to be outputted through the N×N optical switches respectively.

Where, the plurality of K×1/1×K couplers/optical switches of the adding unit and the dropping unit can be integrated into a module. A first port of each coupler outputs through a MPO connector; a second port thereof outputs through another MPO connector, and so on.

The M×1 multiplexer of the adding unit, the 1×M demultiplexer of the dropping unit and the N×N optical switch all can be provided with MPO connectors conveniently. That is, the fiber connection among the 1×M demultiplexer, the N×N optical switch and the K×1 coupler/optical switch of the dropping unit, and the fiber connection among the M×1 multiplexer, the N×N optical switch and the 1×K coupler/optical switch of the adding unit can adopt the MPO connector, to simplify the fiber connection and reduce the needed space. The fiber connections also can be wired from the rear side by way of optical backplane, to further simplify the fiber connection.

Figure 3:
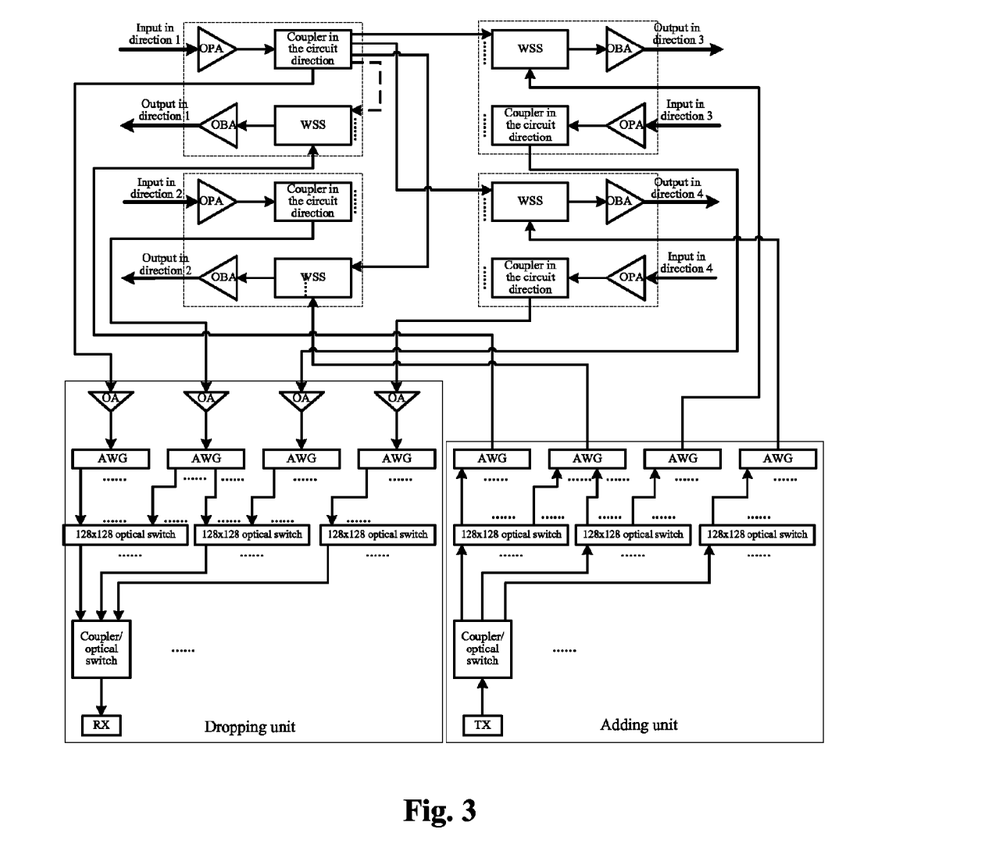
FIG. 3 is a schematic diagram of the ROADM device of four directions according to the first embodiment of the invention.

FIG. 3 shows a diagram of an ROADM device with four directions according to the first embodiment of the present invention. FIG. 3 consists of a circuit part in direction 1, a circuit part in direction 2, a circuit part in direction 3, a circuit part in direction 4, a dropping unit and an adding unit. The connection relationship among direction 1 to direction 4 and the connection relationship between the dropping unit and the adding unit are as follows.

After the input signals in each direction of the circuit directions 1 to 4 are amplified by the OPA, the signals enter the coupler in the circuit direction of each direction. By way of broadcast, the coupler outputs the optical signals to the WSS in each circuit direction and the dropping unit. Then the WSS in each direction selects wavelength signals from the optical signals which are broadcast inputted from the coupler in each direction and the optical signals which are inputted from the adding unit to multiplex, and then outputs the signals to the OBA. Finally the signals are outputted to the circuit optical fiber after being amplified by the OBA. Through the cooperation of these units, the wavelength scheduling among four line directions, the broadcasting function of a signal from the circuit direction and the loopback function of the circuit direction are realized. The wavelength scheduling can be realized by remotely controlling the WSS by a network manager of the device.

In FIG. 3, the dropping unit comprises: an OA, an AWG, 128×128 optical switches and couplers/and optical switches, wherein, the 128×128 optical switches are required to be able to block optical signals not to be outputted, that is, make the optical signals not to be outputted through any port. The connection relation of the dropping unit is as follows.

Optical signals in directions 1-4 broadcasted to the dropping unit through the couplers in the circuit direction are respectively amplified by the OA, and then are outputted to the AWG to separate optical signals of different wavelengths, and finally are outputted to the three 128×128 optical switches. Each 128×128 optical switch switches the input optical signals to the output port. The coupler multiplexes the optical signals selected by the three N×N optical switches and then outputs to the RX for reception, so as to realize the colorless and directionless dropping function. The reconstruction of the dropping wavelength may be realized through the remote control of the 128×128 optical switches by the network administrator of the equipment.

In FIG. 3, the adding unit comprises: AWGs, 128×128 optical switches and couplers/and optical switches, wherein, the 128×128 optical switches are required to be able to block optical signals which need not be outputted, that is, the optical signals will not be outputted through any port. The connection relation of the adding unit is as follows.

Optical signals added through the TX are first broadcasted to three 128×128 optical switches through the couplers/and optical switches. Each 128×128 optical switch switches the optical signals to the output port. The AWG in each direction multiplexes the optical signals selected by Y128×128 optical switches and then outputs them to the WSSes in the corresponding direction. When the TX is a TX with tunable wavelengths, the colorless and directionless adding function is realized. The reconstruction of the adding wavelength may be realized through the remote control of the 128×128 optical switches by the network administrator of the equipment.

Figure 4:
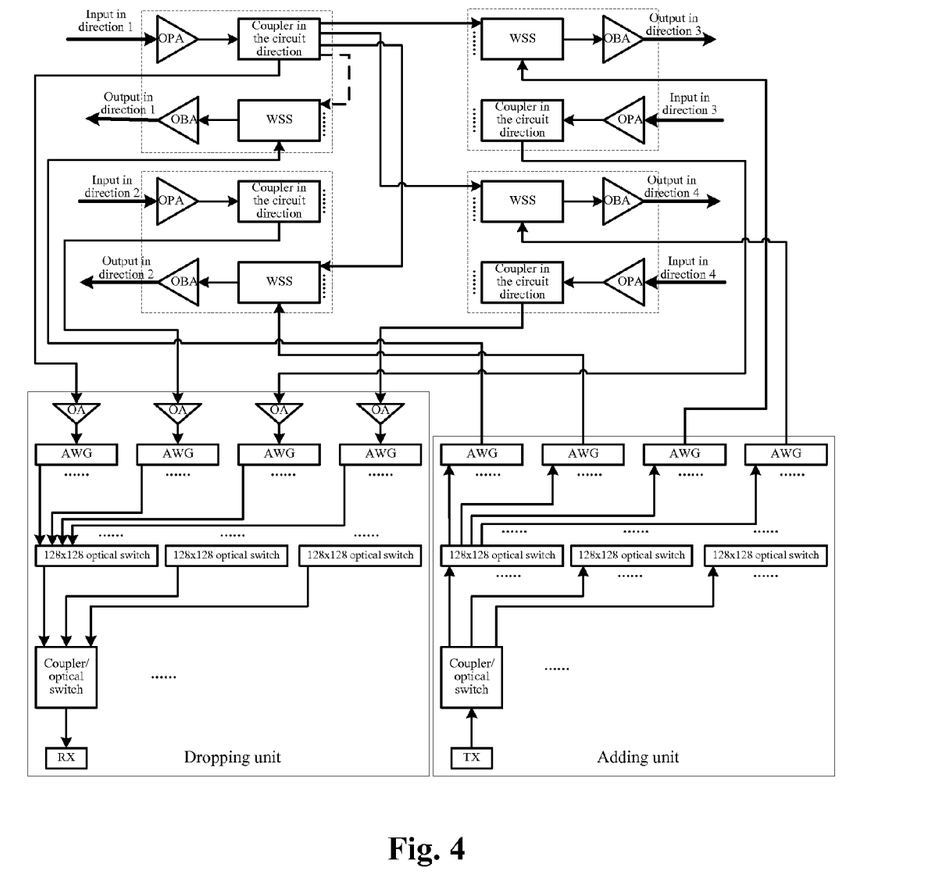
FIG. 4 is a schematic diagram of the ROADM device of four directions according to the second embodiment of the invention.

FIG. 4 shows the diagram of ROADM device with four directions according to the second embodiment of the present invention. The device consists of a circuit portion in direction 1, a circuit portion in direction 2, a circuit portion in direction 3, a circuit portion in direction 4, the dropping unit and the adding unit. The connection relations among the four circuit directions in directions 1-4 and with the dropping unit and the adding unit are as follows:

Input signals from each of circuit directions 1-4 enter the couplers in the circuit directions in each direction after being amplified by the OPA, then the couplers broadcast output the optical signals to WSSes and dropping units in each circuit direction. Then the WSSes in each direction select optical signals from the optical signals broadcast inputted by the couplers in each direction and the optical signals inputted by the adding unit to multiplex and output to the OBA. Finally the signals are amplified and output to the circuit cable by the OBA. Through cooperation of these units, the wavelength scheduling among the four circuit directions, the broadcasting function of signals in the circuit directions, and the loopback function in the circuit directions are realized. The wavelength scheduling may be realized through the remote control of wavelength selection by the network administrator of the equipment.

In FIG. 4, the dropping unit comprises: OA, AWG, 128×128 optical switches and couplers/and optical switches, wherein, the 128×128 optical switches are required to be able to block optical signals not to be outputted, that is, make the optical signals not to be outputted through any port. The connection relation of the dropping unit is as follows.

Optical signals in directions 1-4 broadcasted to the dropping unit through the couplers in the circuit directions are respectively amplified by the OA, and then output to the AWG to separate optical signals of different wavelengths, and finally are outputted to the three 128×128 optical switches. Each 128×128 optical switch switches the input optical signals to the output port. The coupler/optical switch multiplexes the optical signals selected by the three N×N optical switches and then outputs to the RX for reception, so as to realize the colorless and directionless dropping function. The reconstruction of the dropping wavelength may be realized through the remote control of the 128×128 optical switches by the network administrator of the equipment.

In FIG. 4, the adding unit comprises: an AWG, 128×128 optical switches and couplers/and optical switches, wherein, the 128×128 optical switches are required to be able to block optical signals not to be outputted, that is, make the optical signals not to be outputted through any port. The connection relation of the adding unit is as follows.

Optical signals added through the TX are first broadcasted to three 128×128 optical switches through the couplers/and optical switches. Each 128×128 optical switch switches the optical signals to the output port. The AWG in each direction multiplexes the optical signals selected by Y 128×128 optical switches and then outputs to the WSSes in the corresponding direction. When the TX is a TX with tunable wavelength, the colorless and directionless adding function is realized. The reconstruction of the adding wavelength may be realized through the remote control of the 128×128 optical switches by the network administrator of the equipment.

Figure 5:
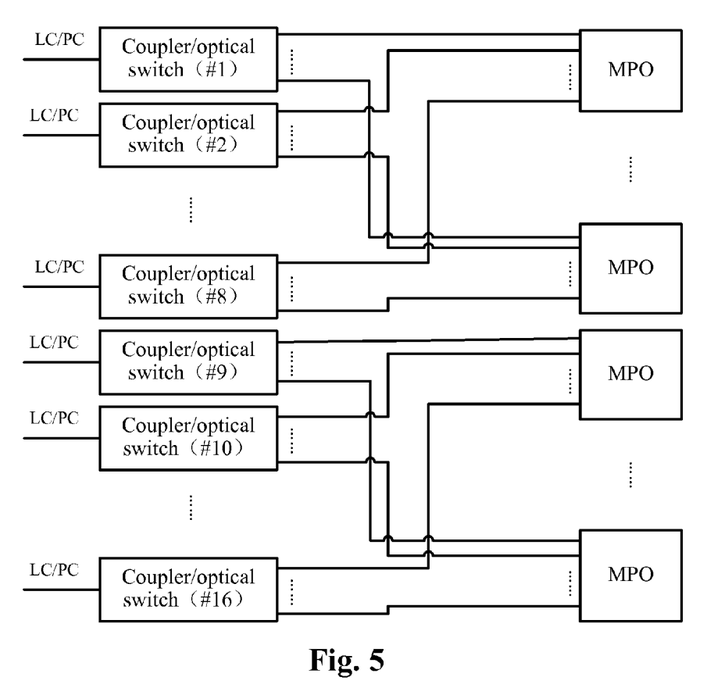
FIG. 5 is a schematic diagram of a 1×4 coupler module according to the embodiment of the invention.

FIG. 5 shows the diagram of a coupler/optical switch module. As shown in FIG. 5, sixteen couplers/optical switches are integrated together, in which the first/second/third/fourth output ends of the first eight couplers/optical switches are respectively led out by four MPO connectors, and the first/second/third/fourth output ends of the last eight couplers are respectively led out by four MPO connectors.

Figure 6:
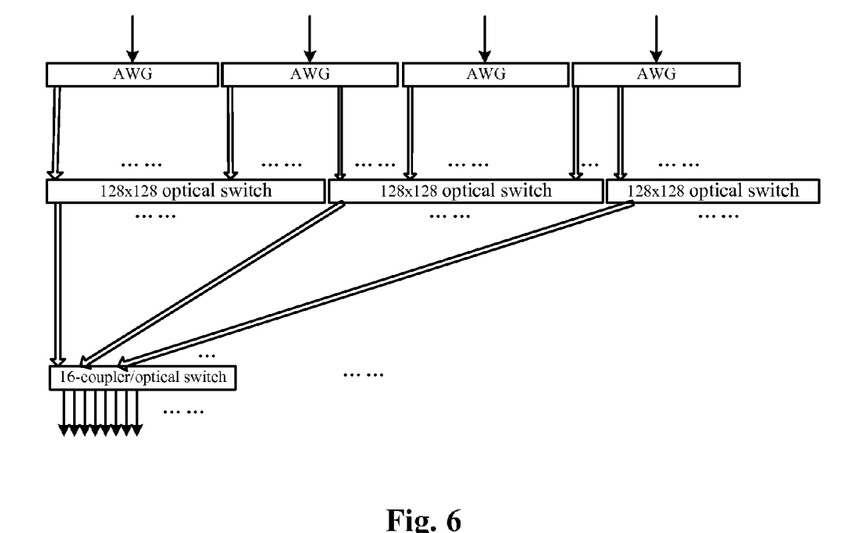
FIG. 6 is a schematic diagram of the optical fiber connection of the dropping unit in the ROADM device with four direction according to the embodiment of the invention.

FIG. 6 shows the diagram of optical fiber connection of the dropping unit of ROADM devices with four directions according to the embodiments of the present invention. The outputs of the AWGs are led out by ten MPO connectors (each MPO connector comprises an output of eight wavelengths), and the input and output ports of the 128×128 optical switches are respectively led out by sixteen MPO connectors (each MPO connector comprises an output of eight wavelengths). The input of the first 128×128 optical switch is first connected with the output of the AWG in direction 1, other ports are connected with parts of outputs of the AWG in direction 2, other output ports of the AWG in direction 2 are connected with the input of the second 128×128 optical switch, other input ports of the second 128×128 optical switch are respectively connected with the output port of the AWG in direction 3 and parts of the output ports of the AWG in direction 4, and the input port of the third 128×128 optical switch is connected with other output ports of the AWG in direction 4. The first eight MPO ports at the output ports of the three 128×128 optical switches are respectively connected with the MPO port of the first 16-coupler/opical switch module. In this way, each eight MPO ports at the output ports of the three 128×128 optical switches are respectively connected with the MPO ports of the 16-coupler/opical switch modules.

The adding unit may also employ the optical fiber connection method similar to that shown in FIG. 6. That is, the optical fiber connection diagram of the adding unit can be obtained by reversing the arrows in FIG. 6.

Figure 7:
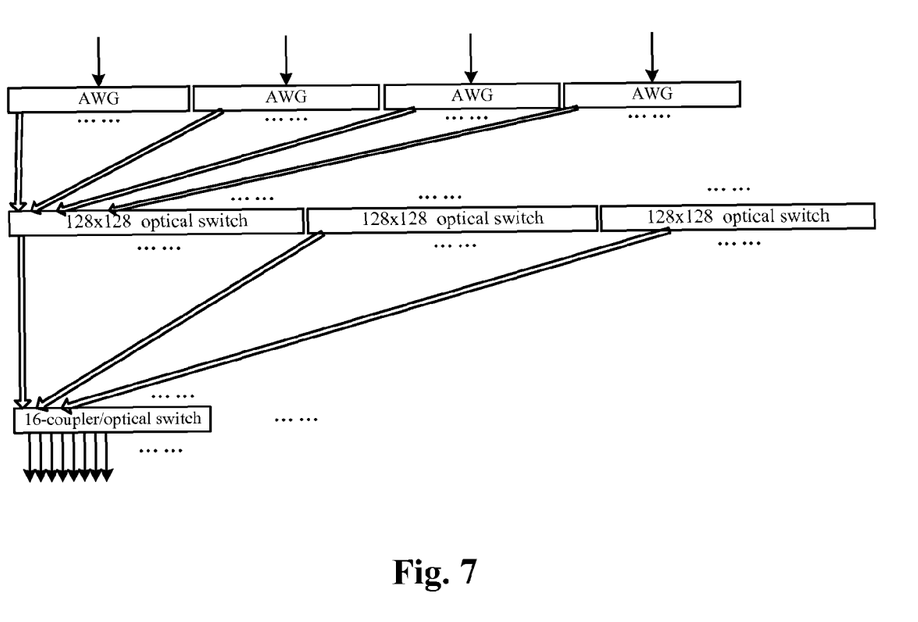
FIG. 7 is schematic diagram of the optical fiber connection of the dropping unit in the ROADM device with four directions according to the embodiment of the invention.

FIG. 7 shows the diagram of optical fiber connection of the dropping unit of ROADM devices with four directions according to the embodiments of the present invention. The outputs of the AWGs are led out by ten MPO connectors (each MPO connector comprises an output of eight wavelengths), and the input and output ports of the 128×128 optical switches are respectively led out by sixteen MPO connectors (each MPO connector comprises an output of eight wavelengths). The input of each 128×128 optical switch is respectively connected with parts of outputs of the AWG in directions 1-4. The first eight MPO ports at the output ports of the three 128×128 optical switches are respectively connected with the MPO ports of the first 16-coupler/opical switch module. In this way, every eight MPO ports at the output ports of the three 128×128 optical switches are respectively connected with the MPO ports of the 16-coupler/opical switch modules.

The adding unit may also employ the optical fiber connection method similar to that shown in FIG. 7. That is, the optical fiber connection diagram of the adding unit can be obtained by reversing the arrows in FIG. 7.

In conclusion, according to the reconfigurable optical add/drop multiplexing device for enabling totally inresistant colorless in the present invention, based on the realization of directionless in adding and dropping and signal broadcasting function in adding and circuit direction as well as the loopback function in the circuit direction, the totally inresistant colorless in adding and dropping is realized. And the utilization of the MPO connectors simplifies the cable connections and the size of equipment and reduces the cost of the equipment.

The present invention is described above in detail to make those skilled in the art to understand the present invention. But it should be understood that the present invention may have other changes and modifications within the scope of the claims of the present invention, and those changes and modifications should be included within the protection scope of the present invention.

What is claimed is:

1. An inresistant, colorless reconfigurable optical add/drop multiplexing device, wherein the device comprises:
    a dropping unit, configured to:
    separate multi-wavelength optical signals which are input to the dropping unit from directions 1 to X,
    switch the multi-wavelength optical signals from the directions 1 to X to any corresponding output port through multiple N×N optical switches, and
    send the optical signals to a corresponding receiver (RX) after combining the received optical signals through a corresponding K×1 coupler/optical switch; and
    an adding unit, configured to:
    broadcast the optical signals sent by a transmitter (TX) to the multiple N×N optical switches through N 1×K couplers/optical switches,
    switch the optical signals to any corresponding output port by the respective N×N optical switches, and
    multiplex the corresponding optical signals in the directions 1 to X and output the corresponding optical signals in a circuit direction;
    wherein, X is an integer which is greater than or equal to 2, and K and N are both integers;
    wherein 1×M optical de-multiplexer units in the directions 1 to X and Y N×N optical switches are arranged in the dropping unit, wherein:
    the 1×M optical de-multiplexer units in the directions 1 to X are connected with the Y N×N optical switches and configured to separate the optical signals with different wavelengths from the directions 1 to X, and output the optical signals to the Y N×N optical switches; and
    the Y N×N optical switches are connected with the 1×M optical de-multiplexer units and configured to switch the input multi-wavelength optical signals in each direction to any corresponding output port, and send the optical signals to the corresponding K×1 couplers/optical switches; wherein, X is an integer which is greater than or equal to 2; K, Y, M and N are all integers greater than 1, K is greater than or equal to Y, and N is greater than or equal to M, and Y×N is greater than or equal to X×M;
    wherein the adding unit is provided with M×1 multiplexers in the directions 1 to X and Y N×N optical switches, wherein:
    the Y N×N optical switches are connected with the M×1 multiplexers and configured to switch the optical signals of multiple direction broadcast from the 1×K couplers/optical switches to any corresponding output port; and
    the M×1 multiplexers in the directions 1 to X are connected with the Y N×N optical switches and configured to output the optical signals after multiplexing the optical signals in the corresponding direction outputted by the N×N optical switches.

2. The inresistant, colorless reconfigurable optical add/drop multiplexing according to claim 1, wherein:
1×L couplers in the directions 1 to X are further arranged in the dropping unit, wherein L is an integer which is greater than or equal to 1; and
the multi-wavelength optical signals which are input from the directions 1 to X are respectively divided into L pieces through the 1×L couplers, and then are outputted to the 1×M optical de-multiplexer units in the directions 1 to X.

3. The inresistant, colorless reconfigurable optical add/drop multiplexing device according to claim 2, wherein an optical amplifier (OA) is further arranged between each of the 1×L couplers in the direction 1 to X and the 1×M demultiplexers in the direction 1 to X, and is configured to amplify the optical signals outputted from the 1×L couplers and output the amplified optical signals to the 1×M demultiplexers in the direction 1 to X.

4. The inresistant, colorless reconfigurable optical add/drop multiplexing device according to claim 1, wherein the adding unit is further provided with L×1 couplers in the directions 1 to X, wherein L is an integer greater than or equal to 1; and the adding unit is configured to couple signals outputted from the M×1 multiplexer through the L×1 couplers and output the coupled signals to the circuit direction.

5. The inresistant, colorless reconfigurable optical add/drop multiplexing device according to claim 1, wherein an optical amplifier (OA) is arranged between each of the L×1 couplers in the directions 1 to X and the M×1 multiplexers in the directions 1 to X, and is configured to amplify the optical signals which are outputted from the M×1 multiplexers in the directions 1 to X and output the amplified optical signals to the L×1 couplers in the directions 1 to X.

6. The inresistant, colorless reconfigurable optical add/drop multiplexing device according to claim 1, wherein
the 1×M demultiplexer of the dropping unit adopts an arrayed waveguide grating (AWG) or thin film filter (TFF) technical device; and
the M×1 multiplexer of the adding unit adopts an AWG or TFF or coupler.

7. The inresistant, colorless reconfigurable optical add/drop multiplexing device according to claim 1, wherein
when the adding unit adopts the 1×K coupler and the dropping unit adopts the K×1 coupler, the N×N optical switches of the adding unit and the dropping unit block the input optical signals which do not need to be outputted through the N×N optical switches respectively, that is, prevent the optical signals from being outputted through any port; and
when the adding unit adopts 1×K optical switch and the dropping unit adopts K×1 optical switch, the N×N optical switches of the adding unit and the dropping unit do not block the input optical signals which do not need to be outputted through the N×N optical switches respectively.

8. The inresistant, colorless reconfigurable optical add/drop multiplexing device according to claim 1, wherein
both the 1×K coupler/optical switch of the adding unit and the K×1 coupler/optical switch of the dropping unit are integrated into a module; a first port of the each coupler outputs through a parallel optical fiber MPO connector; a second port thereof outputs through another MPO connector, and so on; the M×1 multiplexer of the adding unit, the 1×M demultiplexer of the dropping unit and the N×N optical switch all are provided with MPO connectors, that is, the 1×M demultiplexer, the N×N optical switch and the K×1 coupler/optical switch of the dropping unit are connected through a fiber MPO connector; and
the M×1 multiplexer, the N×N optical switch and the 1×K coupler/optical switch of the adding unit are connected through a fiber MPO connector.

9. The inresistant, colorless reconfigurable optical add/drop multiplexing device according to claim 2, wherein
the 1×M demultiplexer of the dropping unit adopts an arrayed waveguide grating (AWG) or thin film filter (TFF) technical device; and
the M×1 multiplexer of the adding unit adopts an AWG or TFF or coupler.

10. The inresistant, colorless reconfigurable optical add/drop multiplexing device according to claim 1, wherein
the 1×M demultiplexer of the dropping unit adopts an arrayed waveguide grating (AWG) or thin film filter (TFF) technical device; and
the M×1 multiplexer of the adding unit adopts an AWG or TFF or coupler.

11. The inresistant, colorless reconfigurable optical add/drop multiplexing device according to claim 2, wherein
when the adding unit adopts 1×K coupler and the dropping unit adopts K×1 coupler, the N×N optical switches of the adding unit and the dropping unit block the input optical signals which do not need to be outputted through the N×N optical switches respectively; and
when the adding unit adopts 1×K optical switch and the dropping unit adopts K×1 optical switch, the N×N optical switches of the adding unit and the dropping unit do not block the input optical signals which do not need to be outputted through the N×N optical switches respectively.

12. The inresistant, colorless reconfigurable optical add/drop multiplexing device according to claim 3, wherein
when the adding unit adopts 1×K coupler and the dropping unit adopts K×1 coupler, the N×N optical switches of the adding unit and the dropping unit block the input optical signals which do not need to be outputted through the N×N optical switches respectively; and
when the adding unit adopts 1×K optical switch and the dropping unit adopts K×1 optical switch, the N×N optical switches of the adding unit and the dropping unit do not block the input optical signals which do not need to be outputted through the N×N optical switches respectively.

13. The inresistant, colorless reconfigurable optical add/drop multiplexing device according to claim 1, wherein
when the adding unit adopts 1×K coupler and the dropping unit adopts K×1 coupler, the N×N optical switches of the adding unit and the dropping unit block the input optical signals which do not need to be outputted through the N×N optical switches respectively; and
when the adding unit adopts 1×K optical switch and the dropping unit adopts K×1 optical switch, the N×N optical switches of the adding unit and the dropping unit do not block the input optical signals which do not need to be outputted through the N×N optical switches respectively.

14. The inresistant, colorless reconfigurable optical add/drop multiplexing device according to claim 4, wherein
when the adding unit adopts 1×K coupler and the dropping unit adopts K×1 coupler, the N×N optical switches of the adding unit and the dropping unit block the input optical signals which do not need to be outputted through the N×N optical switches respectively; and when the adding unit adopts 1×K optical switch and the dropping unit adopts K×1 optical switch, the N×N optical switches of the adding unit and the dropping unit do not block the input optical signals which do not need to be outputted through the N×N optical switches respectively.

15. The inresistant, colorless reconfigurable optical add/drop multiplexing device according to claim 5, wherein when the adding unit adopts 1×K coupler and the dropping unit adopts K×1 coupler, the N×N optical switches of the adding unit and the dropping unit block the input optical signals which do not need to be outputted through the N×N optical switches respectively; and when the adding unit adopts 1×K optical switch and the dropping unit adopts K×1 optical switch, the N×N optical switches of the adding unit and the dropping unit do not block the input optical signals which do not need to be outputted through the N×N optical switches respectively.

16. The inresistant, colorless reconfigurable optical add/drop multiplexing device according to claim 2, wherein both the 1×K coupler/optical switch of the adding unit and the K×1 coupler/optical switch of the dropping unit are integrated into a module; a first port of the each coupler outputs through a parallel optical fiber MPO connector; a second port thereof outputs through another MPO connector, and so on;

the M×1 multiplexer of the adding unit, the 1×M demultiplexer of the dropping unit and the N×N optical switch all are provided with MPO connectors, that is, the 1×M demultiplexer, the N×N optical switch and the K×1 coupler/optical switch of the dropping unit are connected through a fiber MPO connector; and the M×1 multiplexer, the N×N optical switch and the 1×K coupler/optical switch of the adding unit are connected through a fiber MPO connector.

17. The inresistant, colorless reconfigurable optical add/drop multiplexing device according to claim 3, wherein both the 1×K coupler/optical switch of the adding unit and the K×1 coupler/optical switch of the dropping unit are integrated into a module; a first port of the each coupler outputs through a parallel optical fiber MPO connector; a second port thereof outputs through another MPO connector, and so on;

the M×1 multiplexer of the adding unit, the 1×M demultiplexer of the dropping unit and the N×N optical switch all are provided with MPO connectors, that is, the 1×M demultiplexer, the N×N optical switch and the K×1 coupler/optical switch of the dropping unit are connected through a fiber MPO connector; and the M×1 multiplexer, the N×N optical switch and the 1×K coupler/optical switch of the adding unit are connected through a fiber MPO connector.

18. The inresistant, colorless reconfigurable optical add/drop multiplexing device according to claim 1, wherein both the 1×K coupler/optical switch of the adding unit and the K×1 coupler/optical switch of the dropping unit are integrated into a module; a first port of the each coupler outputs through a parallel optical fiber MPO connector; a second port thereof outputs through another MPO connector, and so on;

the M×1 multiplexer of the adding unit, the 1×M demultiplexer of the dropping unit and the N×N optical switch all are provided with MPO connectors, that is, the 1×M demultiplexer, the N×N optical switch and the K×1 coupler/optical switch of the dropping unit are connected through a fiber MPO connector; and the M×1 multiplexer, the N×N optical switch and the 1×K coupler/optical switch of the adding unit are connected through a fiber MPO connector.

* * * * *